July 11, 1939.  J. W. ALLQUIST  2,165,438

EXTRACTION OF SUBSTANCES FROM SOLUTIONS

Filed July 25, 1936

Zone of high selectivity

Increasing gleanability and decreasing selectivity

Zone of high gleanability

INVENTOR
John William Allquist
BY
Pennie, Davis, Marvin & Edmonds
ATTORNEYS

UNITED STATES PATENT OFFICE 2,165,438

EXTRACTION OF SUBSTANCES FROM SOLUTIONS

John William Allquist, Rome, Ga., assignor to Tubize Chatillon Corporation, New York, N. Y., a corporation of Delaware Application July 25, 1936, Serial No. 92,528

3 Claims. (Cl. 260—541)

This invention relates to extraction of substances from solutions thereof and is particularly concerned with the extraction of water soluble fatty acids, such as acetic acid, from aqueous solutions.

In manufacturing rayon by the acetate process, large quantities of dilute aqueous acetic acid solutions are produced. The acetic acid content of these solutions cannot be returned to the process unless it is in concentrated form. It is possible to concentrate the acetic acid by directly distilling the dilute aqueous solution of acetic acid. This, however, is not economically desirable because of the large heat consumption involved.

To avoid this high heat consumption it has been proposed heretofore to employ a solvent for acetic acid which will extract the acetic acid from the water but is at least partially immiscible therewith, so that a solution with a higher concentration of acetic acid is produced and separated out. The amount of heat necessary to separate the acetic acid from the solvent in this more concentrated separated solution is appreciably less than the amount of heat necessary to separate the acetic acid directly from the water.

In accordance with the aforementioned proposal the dilute solution of acetic acid and the solvent pass countercurrent to each other through a tower or other container. If the solvent is of lower specific gravity than the solution it is admitted at the bottom of the tower and floats upward through a pool of the solution, extracting acetic acid (accompanied by more or less water) on its way. The depleted solution with little or no acetic acid content is drained from the bottom of the container. The solvent which has picked up acetic acid is drawn from the top of the container, and subjected to treatment, such as distillation, to remove its acetic acid content in concentrated form. If the solvent has a higher specific gravity than the solution the direction of flow is reversed, i. e., the solvent is admitted at the top of the chamber and sinks through a pool of the solution, an enriched solvent product being drawn from the bottom and the depleted solution from the top of the column.

In order to obtain ideal results with such a process, namely, to obtain a residual aqueous solution containing no acetic acid and a solvent product containing a high concentration of acetic acid and little or no water (while employing a relatively small amount of solvent), the solvent employed should have both high "gleanability" and "selectivity". By "gleanability" I mean the power which some solvents have to extract or glean practically all of the acetic acid from the solution so as to leave it substantially free of acetic acid, although a comparatively large proportion of water may also be dissolved by the solvent in gleaning the acetic acid. By "selectivity" I mean the power to extract acetic acid from the solution while extracting little or no water from the solution. Unfortunately, no single commercial solvent or solvent mixture possesses both properties in an adequate degree.

In general, solvents for acetic acid that are substantially immiscible in water have high selectivity and low gleanability, i. e., they extract acetic acid from aqueous solutions without extracting a relatively large proportion of water, but they do not tend to leave the depleted aqueous solution free of acetic acid unless an abnormally large proportion of solvent to solution is employed. Among such solvents are benzene, pentane and isopropyl ether.

Conversely, solvents which are relatively miscible with water generally have high gleanability and low selectivity, i. e., a relatively small quantity of the solvent will extract all the acetic acid from the solution but in doing so will pick up a relatively large quantity of water. Examples of such solvents are ethyl ether and ethyl acetate.

The difference in the action of these two classes of solvents is shown by the following examples:

If isopropyl ether is used as a solvent extractor a final solvent product may be obtained containing 8% acetic acid and only 2.1% water, but in obtaining such a product a large proportion of acetic acid may remain in the solution, and the ratio of the quantities of isopropyl ether to solution may be high.

If, instead of isopropyl ether, ethyl acetate is employed and the same procedure followed, a solvent product containing 12% acetic acid and 12% of water may be obtained, but a more complete extraction of acetic acid from the solution will result with a lower ratio of solvent to solution.

If a mixture of solvents selected from the two classes is employed the mixture does not have the high gleanability of the miscible solvent and the high selectivity of the immiscible solvent. Such mixing merely results in averaging the various properties of the various solvents, whereas what is desired is a process in which the high gleanability of the more miscible solvent and the high selectivity of the less miscible solvent cooperate in their effects to produce complete extraction of acetic acid from the solution with a relatively small volume of solvent, and a solvent product containing a high concentration of acetic acid and a low concentration of water.

Prior proposals to obtain cooperation of the high gleanability of a relatively miscible solvent with the high selectivity of a relatively immiscible solvent in extracting a fatty acid or the like from its aqueous solution have included first mixing the solution with the more miscible solvent, separating the depleted solution from the more miscible solvent which has picked up the fatty acid, distilling the solution of the fatty acid in the more miscible solvent to obtain a second aqueous solution of fatty acid of higher concentration, and then mixing this second aqueous solution with the less miscible solvent. The less miscible solvent, on account of the increased concentration of the fatty acid in the second aqueous solution, is enabled to extract a relatively large quantity of the fatty acid without extracting a large quantity of water. There are various objections to this proposal, chief among which is the fact that the distillation of the second aqueous solution involves extra handling and consumes time and money.

It has also been proposed to bring an original aqueous solution of fatty acid into contact with a relatively miscible solvent of high gleanability, and thus extract the fatty acid, separating the relatively miscible solvent with the extracted fatty acid from the depleted solution, and adding to and mixing with the separated miscible solvent containing the fatty acid a second solvent of low miscibility and high selectivity. Upon mixing, water is dropped out of the mixture to some extent. Chief objections to this proposal arise from the fact that the mixing of the two solvents merely produces a solvent mixture having the average gleanability and the average selectivity of the two solvents. This gleanability is less than that of the first and relatively miscible solvent so that some fatty acid is dropped out along with the water. The selectivity of the mixture is also less than the selectivity of the second and less miscible solvent, so that the fatty acid retained by the second solvent after mixing is accompanied by a greater proportion of water than would accompany it if the original aqueous solution had been treated directly with the second and less miscible solvent.

As a result of my investigations I have invented a process whereby the high gleanability of a relatively miscible solvent and the high selectivity of a relatively immiscible solvent are enabled to cooperate to a degree not attained heretofore, with the result that a thorough extraction of a substance from a solution can be obtained with a minimum quantity of solvent while the solvents withdrawn from the system contain a higher concentration of the extracted substance and a lower concentration of the original solvent.

My invention is based upon the discovery that a column of liquid, through which the gleanability for the substance to be extracted gradually decreases as the selectivity for the substance increases, acts in a manner analogous to that in which a rectifying column operates in a distillation process. By maintaining a column of liquid containing such an immiscible solvent, and by maintaining high selectivity in one zone in the column and high gleanability in another zone in the column, both the selectivity and the gleanability of the column as a whole are improved. Thus, if the column contains two solvents, the first of high gleanability and low selectivity, the second of high selectivity and low gleanability, the effective gleanability of the column as a whole approaches that of the first solvent while the effective selectivity of the column as a whole tends to approach the selectivity of the second solvent. In other words, the effective gleanability of the column is greater than the average gleanability of its two solvent constituents while the effective selectivity of the column is greater than the average selectivity of its two solvent constituents.

A solvent column of the character described may be maintained in several ways. Thus, one zone of the column may be maintained with higher gleanability and lower selectivity than a second zone by keeping the first zone hotter than the second zone. A similar result may be obtained by blending two solvents in the column, maintaining at one zone a high concentration of a solvent having a high selectivity and a low gleanability while maintaining at the other zone a high concentration of a different solvent having a higher gleanability and a lower selectivity.

These and other features of my invention will be more thoroughly understood in the light of the following detailed description taken in conjunction with the accompanying drawing, in which—

Figure 1:
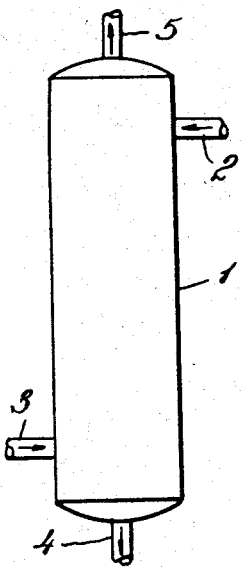
Fig. 1 is a diagrammatic representation of a conventional extractor used in the prior art.

Throughout the following description, the process is considered as conducted with solvents which have a lower specific gravity than the original solution, so that when introduced into a column of the solution the solvents tend to rise to the top thereof. The process, of course, may be practiced also with solvents which are heavier than the original solutions, in which case the direction of flow of solution and solvents is reversed.

The description is made with specific reference to extracting acetic acid from dilute aqueous solutions thereof. The process, however, is applicable to the extraction of many other substances from many other solutions, because the principles involved are the same. In general, my process is applicable for extracting any soluble substance from a dilute solution thereof in a first solvent whenever there is available a solvent which has increased gleanability and decreased selectivity when heated and which is at least partially immiscible with the first solvent, or whenever there are available two solvents for the substance which are at least partially immiscible with the first solvent, one of the two having high gleanability, the other high selectivity.

As used here, the general definition of gleanability is the power which one solvent has to extract a solute from another solvent, leaving the depleted liquid free of the solute to be recovered. The lower the quantity of the solute in the depleted liquid, the greater is the gleanability of the first solvent, all other factors in the extraction process remaining constant.

The general definition of selectivity as used here is the power of a solvent to extract a solute from a second solvent without picking up a large proportion of the second solvent as well. The greater the ratio of the quantity of solute extracted to the quantity of the second solvent extracted, the greater is the selectivity of the first solvent.

A brief consideration of the operation of a conventional extractor for the extraction of the acetic acid from a dilute aqueous solution thereof may assist in understanding the invention. The extractor of Fig. 1 comprises an upright elongated cylindrical vessel 1 closed at the ends and provided with an inlet pipe 2 in its side near the top for introducing the dilute aqueous solution of acetic acid. The extracting solvent is introduced into the vessel through a pipe 3 which communicates with the side of the vessel near the bottom. A drain pipe 4 is provided for removing the depleted aqueous solution from the bottom of the vessel, and a pipe 5 fastened to the top of the vessel is provided for withdrawing the solvent after it has extracted the acetic acd. The vessel may be provided with baffles, such as staggered plates, perforated horizontal plates or bubble trays (not shown).

A conventional method of operating the apparatus of Fig. 1 is to introduce a continuous stream of a 25% aqueous solution of acetic acid into the vessel through the pipe 2, and a continuous stream of a solvent mixture containing 25% ethyl acetate and 75% isopropyl ether through the pipe 3, while continuously draining off the depleted aqueous solution through the drain pipe 4 and continuously withdrawing the solvent mixture containing the extracted acetic acid through the pipe 5 at the top of the vessel. The rate of flow is so adjusted that the vessel is always full. For each 1 part of 25% aqueous acetic acid solution introduced it is customary to introduce about 2.003 parts of the solvent mixture composed of 25% ethyl acetate and 75% isopropyl ether. Countercurrent and mutual penetration between the solvent mixture and the aqueous acetic acid solution is set up because the solvent mixture is lighter than the solution.

Figure 2:
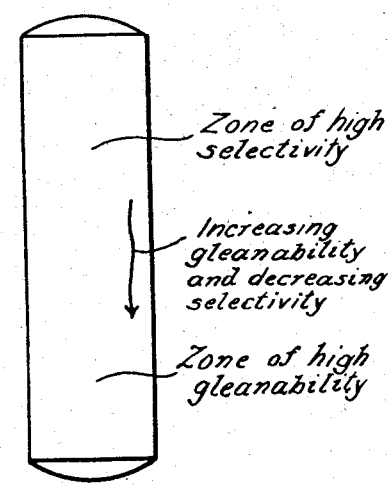
Fig. 2 is a schematic representation of the solvent column which should be maintained in the practice of my invention.

My process departs from the conventional practice just described in several particulars, chief of which is that the extracting column of liquid in the vessel is maintained with higher selectivity in one zone and a higher gleanability in another zone, as shown in Fig. 2. This permits the extracting column to extract acetic acid from aqueous solution without extracting much water and at the same time to make a substantially complete extraction of the acetic acid with a minimum amount of solvent. As indicated previously, the action of the extracting column is analogous to the action of a rectifying column in distillation.

If a mixture of two liquids having different boiling points is boiled and the resulting vapor is merely condensed, the bulk condensate will contain both liquid constituents of the mixture. The simple process has not exercised much selectivity as between the two liquid constituents. However, if the vapor from the boiling mixture is passed through a reflux column, the reflux will tend to carry back into the boiling mixture that liquid constituent which condenses most easily and the condensate withdrawn from the upper end of the reflux column will contain a higher proportion of the other liquid ingredient. The nearer one comes to the top of the reflux column the higher will be the proportion of this other liquid ingredient in the vapor. In other words, selectivity increases toward the top of the column. However, as selectivity increases, the gleanability of the rectifying column decreases because any given horizontal section near the bottom of the column may contain a greater quantity of the less easily condensible liquid than an equal section at a higher point in the column since the reflux, while containing only a small proportion of the less easily condensible liquid, may amount to several times the vapor output at the top of the column. The analogy with the action of the extracting column employed in my process will be apparent.

Increased selectivity in one zone and increased gleanability in another zone of an extracting column of liquid may be obtained in several ways in the practice of my invention. Thus the process illustrated in Fig. 1 employing a single extracting solvent may be improved by maintaining the liquid in the bottom of the column hotter than the liquid in the top of the column. Most solvents for acetic acid and the like manifest more gleanability when hot, i. e., a given volume of the solvent will hold more acetic acid, but at the same time the hot solvents have less selectivity, i. e., they will pick up and hold a larger proportion of water along with the acetic acid. Hence maintaining the solvent in the bottom of the extracting column at a higher temperature than the solvent in the top of the extracting column brings about the desired gradation in selectivity and gleanability from top to bottom of the column. The amount of gradation, of course, depends upon the difference in temperature between top and bottom of the column. The difference in temperature may be brought about by adding heat to the solvent in the bottom of the column or by removing heat from the top of the column, or both. The addition or removal of heat may be accomplished by means of heating jackets (not shown) on the bottom of the column or by cooling jackets on the top of the column (not shown). It may also be accomplished by cooling liquids before they are fed into the top of the column or by heating liquids before they are fed into the bottom of the column.

It is also possible to maintain an extracting column of liquid with a high selectivity in one zone and a high gleanability in another zone with gradually decreasing selectivity and gradually increasing gleanability from the first to the second zone without maintaining a substantial difference in the temperature of the two zones in the column. This is accomplished by employing two solvents, one having high selectivity, the other high gleanability, and maintaining a high concentration of one solvent in one zone in the column and a high concentration of the other solvent in the other zone in the column. The apparatus illustrated in Figs. 3 and 4 are adapted to this practice.

Figure 3:
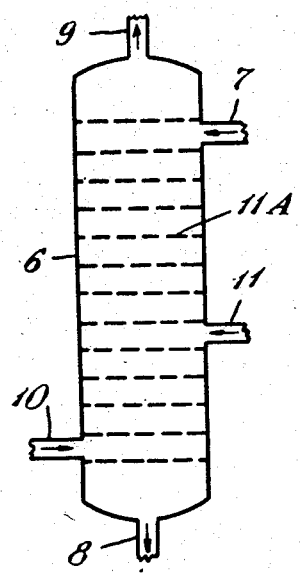
Fig. 3 is a diagrammatic representation of a presently preferred form of extractor for the practice of my invention.
Figure 4:
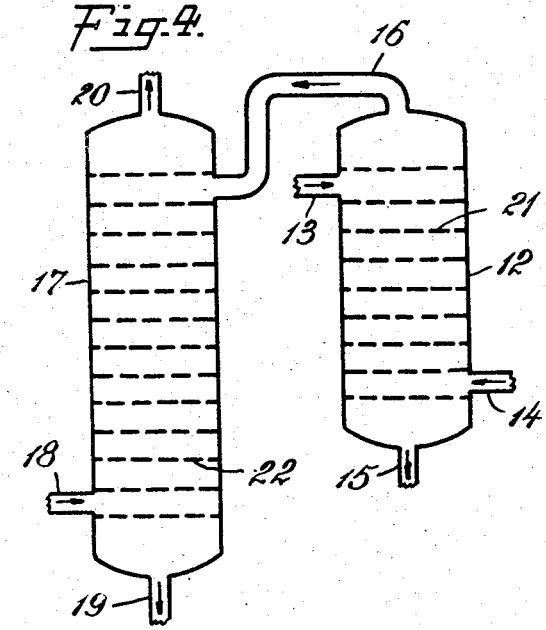
Fig. 4 is a diagram of an apparatus adapted to a modified practice of my invention.

Now considering the practice of the invention illustrated in Fig. 3, it will be seen that the extractor is somewhat similar to that of Fig. 1, comprising an upright elongated cylindrical vessel 6 with closed ends and provided with an inlet pipe 7 at the side near the top for introducing aqueous acetic acid solution, a drain pipe 8 at its lower end for draining out the depleted solution, and a top outlet pipe 9 for withdrawing solvent accompanied by extracted acetic acid. An inlet pipe 10 entering the side of the vessel near the bottom is provided for introducing the solvent or solvent mixture of high gleanability. On the side of the vessel intermediate the inlet for the fresh solution and the inlet for the solvent of high gleanability is provided a second inlet pipe 11 for introducing the solvent of high selectivity. The action of the extractor is improved if it contains a plurality of spaced baffles, such as horizontal perforated trays or bubble trays 11A.

In a preferred practice of the invention the vessel is kept full and dilute acetic acid solution is pumped continuously into the vessel through its inlet pipe while depleted solution is continuously removed through the drain. For each part of 25% acetic acid solution introduced through the pipe 7, 1.557 parts of isopropyl ether are continuously introduced into the vessel through the inlet pipe 11 and .474 part of ethyl acetate is continuously introduced through the inlet pipe 10. Through the top outlet a continuous stream of solvent accompanied by extracted acetic acid is drawn. When the operation is conducted according to this method the efficiency of extraction is appreciably increased. That is, if the apparatus illustrated in Fig. 1 and Fig. 3 are operated at the same rate with the same feed and with the same temperature gradient from top to bottom of the vessel, the depleted solution draining out of the apparatus of Fig. 3 will contain less acetic acid than that draining out of the apparatus of Fig. 1, other things being equal. Moreover, other things being equal, the solvent withdrawn from the top of the apparatus of Fig. 3 will have a higher concentration of acetic acid and a lower concentration of water than the solvent withdrawn from the top of the apparatus of Fig. 1.

These improved results are attributable to the fact that there is a high concentration of ethyl acetate in the vessel of Fig. 3 in the neighborhood of the inlet pipe 10 and a high concentration of isopropyl ether in the neighborhood of the inlet pipe 11. High concentration of ethyl acetate produces high gleanability. High concentration of isopropyl ether produces high selectivity. The concentration of ethyl acetate decreases in the vessel as the distance from the inlet pipe 10 increases. Similarly, the concentration of isopropyl ether increases in the vessel as the distance from inlet pipe 10 increases. Consequently, there is established and maintained an extracting column in which selectivity increases as gleanability decreases and vice versa.

The apparatus illustrated in Fig. 4 is also adapted to the maintenance of an extracting column of liquid with a gradually increasing selectivity and decreasing gleanability. The apparatus comprises two upright elongated cylindrical vessels 12 and 17 with closed ends. The vessel 12 is provided with an inlet 13 on its side near the top for introducing a dilute aqueous solution of acetic acid, and with a side inlet 14 near the bottom for introducing a solvent of high gleanability, say ethyl acetate. At the bottom of the vessel 12 is a drain 15 for withdrawing the impoverished aqueous solution, and at the top of the vessel is connected an outlet pipe 16 for withdrawing the solvent product of the vessel 12, namely, a solution containing ethyl acetate, water and acetic acid.

The outlet pipe 16 is connected to the side of the second vessel 17 near the top. This second vessel is provided with a drain 19 at the bottom and with a side inlet 18 for a solvent of high selectivity, say isopropyl ether, near the bottom. At the top of the second vessel is an outlet 20 from which the final solvent product of the process is drawn.

Both vessels 12 and 17 preferably are provided with a plurality of spaced transverse baffles such as perforated plates or bubble trays 21, 22.

The operation of the process in the apparatus of Fig. 4 is as follows: The first extraction vessel 12 functions in accordance with prior art proposals. Dilute aqueous acetic acid is passed continuously into the column through the inlet 13 and passes downwardly to the drain 15 in countercurrent to a continuously rising stream of a solvent, say ethyl acetate. The depleted aqueous solution is continuously drained out of the vessel at the lower end, and a new solution of ethyl acetate, acetic acid and considerable water is drawn off of the first vessel and continuously introduced into the second vessel where it encounters a continuous stream of a solvent of high selectivity, say isopropyl ether. Water drops out of solution and is removed through the drain from the second vessel, and the dewatered mixture is continuously withdrawn from the top of the second vessel.

It is in the second vessel that the column of liquid having a gradually increasing selectivity and a gradually decreasing gleanability is maintained. In the zone where the pipe 14 enters the first vessel the concentration of ethyl acetate is highest and hence the gleanability of the column is at a maximum here. At the entrance of the pipe 18 in the vessel the concentration of isopropyl ether is highest; hence this zone exhibits maximum selectivity. In between these two inlets there is a gradual decrease in gleanability from the entrance of 14, and an accompanying increase in selectivity. The ethyl acetate in passing through the first vessel picks up substantially all the acetic acid, but it also picks up more water than isopropyl ether will hold. Hence in the second column water is gradually thrown out of solution from the top of the column to the bottom and is removed through the drain. However, the effective gleanability and the effective selectivity of the column of liquid in the second vessel (on account of the lack of homogeneity of the solvent content throughout the column) are both higher than would be the case if the inflow from 16 were merely mixed indiscriminately with the inflow from 18.

In the practical operation of the apparatus of Fig. 4, 0.785 part of ethyl acetate is pumped into the first vessel and 1.227 parts of isopropyl ether are pumped into the second vessel for every 1 part of 25% aqueous acetic acid solution introduced into the first vessel. The extraction which takes place in the first vessel under these conditions is equivalent to raising the acetic acid concentration from 25% to 47.5%. At this higher concentration isopropyl ether is more effective and has in fact a higher gleanability as well as a higher selectivity.

The choice of the solvents to be employed in maintaining an extracting column with high selectivity in one zone and high gleanability in another depends, of course, upon the substance to be extracted and the solvent in which it is originally present.

For extracting acetic acid from aqueous solutions the solvent of high selectivity should have substantially no solubility in or for water, i. e. reciprocal solubilities of .2% or less. On the other hand, the solvent must have a relatively high reciprocal solubility for acetic acid. The group of suitable solvents includes liquid hydrocarbons, most of their halogen derivatives, most of the normal and mixed ethers and the liquid ethers boiling above 120° C.

Solvents having high gleanability for acetic acid in aqueous solutions usually dissolve 5% of water and are soluble in water up to 10%. The liquid esters boiling below 100° C., the ethers boiling below 50° C., and the high boiling ketones, aldehydes and alcohols are of this character.

Following is a list of solvents which may be employed in the practice of my invention:

| High selectivity | High gleanability |
| --- | --- |
| Isopropyl ether. | Ethyl ether. |
| Benzene, toluene, xylene. | Ethyl acetate. |
| Pentane. | Propyl acetate. |
| Chloroform, carbon tetrachloride. | Furfural. |
| Methylene, ethylene, propylene halides. | Cycohexanones. |
| Octyl acetate. | Propyl formate. |
| Cyclohexanol acetate. | Butyl alcohol. |
| Tetralin, decalin. | Cyclohexanol. |
| Cyclohexane. | Amyl alcohol. |
| Ethyl acetoacetate. | Acetone oils—mixtures of propyl, butyl, amyl, etc. |
| Acetophenone. | Ketones. |
| Aryl ethers. | Methyl propionate. |
| Carbon disulfide. | Cresol (o, m and p). |

In choosing a pair of solvents for practicing the invention azeotropic distillation ratio, azeotropic boiling point and its proximity to the boiling point of the substance extracted should be borne in mind if the substance extracted is to be separated from the extracting solvents by distillation.

It will be understood that a column having a zone of high selectivity and another zone of high gleanability for the practice of the invention may be maintained by holding the zone of high gleanability at a higher temperature than the zone of high selectivity, at the same time employing a different combination of solvents in the two zones as hereinbefore described.

It will be noted that in the column of Fig. 3 the gleanability increases toward a lower zone in the column and the selectivity increases toward an upper zone in the column, the direction of passage of the impoverished solution (water) being downward. In the apparatus of Fig. 4 the direction of passage of the impoverished solution (water) is also downward but the zone of high gleanability is more or less confined to vessel 12, especially near inlet 14, while the zone of high selectivity is more or less confined to vessel 17, especially near inlet 18. This, however, I have found to be immaterial. Both arrangements operate equally well.

I claim:

1. Process for extracting a substance from its first solution in a first solvent which comprises maintaining a column of liquid containing one or more other solvents for the substance which are at least partially immiscible with the first solvent, maintaining a relatively high selectivity and low gleanability for the substance in one zone of the column of liquid, maintaining a gradually decreasing selectivity and a gradually increasing gleanability for the substance in successive cross sections of the column toward another zone therein, maintaining a relatively high gleanability and a relatively low selectivity for the substance in said other zone of the column of liquid, said zone of high selectivity and said zone of high gleanability being maintained by maintaining a difference in the temperature of the immiscible solvent in the two zones, passing the substance to be extracted accompanied by the first solvent through the column of liquid and in contact therewith from one zone to the other, withdrawing the resulting depleted first solvent from the column of liquid, and withdrawing from the column of liquid the resulting new solution of the substance in the immiscible solvent.

2. A process for extracting a substance from its first solution in a first solvent which comprises maintaining a column of liquid containing one or more solvents for the substance which are at least partially immiscible with the first solvent, maintaining a relatively high selectivity and low gleanability for the substance in one zone of the column of liquid, maintaining a gradually decreasing selectivity and a gradually increasing gleanability for the substance in successive cross sections in the column toward another zone therein, maintaining a relatively high gleanability and a relatively low selectivity for the substance in said other zone of the column of liquid, heating said zone of high gleanability and low selectivity, passing the substance to be extracted accompanied by the first solvent through the column of liquid and in contact therewith from one zone to the other, withdrawing the resulting depleted first solvent from the column of liquid, and withdrawing from the column of liquid the resulting new solution of the substance in the partially immiscible solvent.

3. A process for extracting a substance from its first solution in a first solvent which comprises maintaining a column of liquid containing one or more other solvents for the substance which are at least partially immiscible with the first solvent, maintaining a relatively high selectivity and low gleanability for the substance in one zone of the column of liquid, maintaining a gradually decreasing selectivity and a gradually increasing gleanability for the substance in successive cross sections in the column toward another zone therein, maintaining a relatively high gleanability and a relatively low selectivity for the substance in said other zone of the column of liquid, removing heat from the column of liquid in the zone of high selectivity, passing the substance to be extracted accompanied by the first solvent through the column of liquid and in contact therewith from one zone to the other, withdrawing the resulting depleted first solvent from the column of liquid and withdrawing from the column of liquid the resulting new solution of the substance in the immiscible solvent.

JOHN WILLIAM ALLQUIST.